United States Patent
Cortes-Concepcion et al.

(10) Patent No.: US 9,321,638 B2
(45) Date of Patent: Apr. 26, 2016

(54) USE OF TRIPHENYL PHOSPHATE AS RISK MITIGANT FOR METAL AMIDE HYDROGEN STORAGE MATERIALS

(71) Applicant: Savannah River Nuclear Solutions, LLC, Aiken, SC (US)

(72) Inventors: Jose A. Cortes-Concepcion, Aiken, SC (US); Donald L. Anton, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 129 days.

(21) Appl. No.: 13/737,131

(22) Filed: Jan. 9, 2013

(65) Prior Publication Data

US 2014/0193320 A1    Jul. 10, 2014

(51) Int. Cl.
*C01B 3/00* (2006.01)

(52) U.S. Cl.
CPC ............... *C01B 3/0078* (2013.01); *C01B 3/001* (2013.01); *Y02E 60/324* (2013.01)

(58) Field of Classification Search
CPC ............. C01B 6/04; C01B 6/24; C01B 3/02; C01B 3/0078; C01B 3/001; Y02E 60/324
See application file for complete search history.

(56) References Cited

U.S. PATENT DOCUMENTS

| | | |
|---|---|---|
| 6,967,012 B2 | 11/2005 | Meisner et al. |
| 8,071,064 B2 | 12/2011 | Herbst et al. |
| 2009/0119989 A1 * | 5/2009 | Withers-Kirby et al. ......... 48/61 |

OTHER PUBLICATIONS

Godula-Jopek et al. "Hydrogen Storage Technologies" 2012, Wiley-VCH, 2nd edition.*
Wang et al. Effects of triphenl phosphate on the hydrogen storage performace of the Mg(NH2)2-2LiH system, J. Mater Chem. 2009, 19, 2141-2146.*
Jianhui Wang et al., Effects of triphenyl phosphate on the hydrogen storage perfomance of the $Mg(NH_2)_2$—2LiH system; J. Mater Chem., 2009, 19, 2141-2146.

* cited by examiner

*Primary Examiner* — Stanley Silverman
*Assistant Examiner* — Syed Iqbal
(74) *Attorney, Agent, or Firm* — J. Bennett Mullinax, LLC

(57) ABSTRACT

A process in a resulting product of the process in which a hydrogen storage metal amide is modified by a ball milling process using an additive of TPP. The resulting product provides for a hydrogen storage metal amide having a coating that renders the hydrogen storage metal amide resistant to air, ambient moisture, and liquid water while improving useful hydrogen storage and release kinetics.

3 Claims, 1 Drawing Sheet

USE OF TRIPHENYL PHOSPHATE AS RISK MITIGANT FOR METAL AMIDE HYDROGEN STORAGE MATERIALS

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards the use of triphenyl phosphate (TPP) as an additive agent to an amide hydrogen storage material. The application of the TPP to an amide hydrogen storage material reduces the reactivity of the amide with air or water. Further, the addition shows improvements in cyclic sorption properties in terms of rehydregation durability of the metal amide.

BACKGROUND OF THE INVENTION

This invention relates generally to improvements to metal amide materials such as lithium magnesium amides. Metal amides are well known for hydrogen storage systems. One characteristic of metal amides concerns the lack of stability of metal amide material when exposed to moisture, air, or liquid water. Under such conditions, the metal amide undergoes a spontaneous ignition. The difficulty of safely handling hydrogen storage materials such as metal amides may limit the ability to use these materials in certain commercial technologies Accordingly, there remains room for improvement and variation within the art.

SUMMARY OF THE INVENTION

It is one aspect of at least one of the present embodiments of the invention to provide for a stabilized amide hydrogen storage material which is resistant to exposure to air, ambient moisture, and liquid water.

It is a further aspect of at least one embodiment of the present invention to provide a stabilized amide for hydrogen storage which involves a mechanical mixing of the metal amide with TPP.

A further aspect of at least one of the present embodiments of the invention to provide for a ball milling process for a hydrogen storage amide in which TPP is introduced as a stabilizing agent and the resulting stabilized product maintains useful hydrogen release and adsorption kinetics of the amide.

It is yet a further and more particular aspect of at least one embodiment of the present invention to provide for a surface stabilization process and product by the process of making a hydrogen storage metal amide having at least a surface of the amide being stabilized by ball milling in the presence of TPP.

It is yet a further and more particular object of at least one aspect of the present invention to provide for particulates of a hydrogen storage amide in which the particulate surface is stabilized by the introduction of TPP to the metal amide surface.

It is yet a further and more particular object of at least one aspect of the present invention to provide for a hydrogen storage amide stabilized with TPP in which, upon exposure to moisture or water, will form a surface charring that provides an insulating surface which avoids ignition of the metal amide.

It is yet a further and more particular object of at least one aspect of the present invention to provide for a process of stabilizing a hydrogen storage metal amide from exposure to air and water comprising:
  providing a supply of a hydrogen storage amide;
  introducing into the hydrogen storage metal amide an effective amount of TPP;
  ball milling the combination of the hydrogen storage amide and TPP wherein following ball milling, the hydrogen storage metal amide is resistant to water and air decomposition.

It is yet a further and more particular object of at least one aspect of the present invention to provide for a process as set forth above where an effective amount of TPP is about 3 to about 5-mole % relative to the hydrogen storage metal amide.

It is yet a further and more particular object of at least one aspect of the present invention to provide for a process as set forth above wherein the supply of a hydrogen storage metal amide further comprises $8LiH-3Mg(NH_2)_2$.

It is yet a further and more particular object of at least one aspect of the present invention to provide for a process as set forth above comprising an additional step following ball milling of charring an outer surface of the. TPP coated hydrogen storage metal amide.

It is yet a further and more particular object of at least one aspect of the present invention to provide for a hydrogen storage metal amide resistant to moisture and water comprising:
  a metal amide particle having an exterior surface of the particle coated with an effective amount of TPP wherein the TPP provides protection to the metal amide when exposed to water.

It is yet a further and more particular object of at least one aspect of the present invention to provide for a metal amide which is resistant to moisture and water consisting essentially of:
  a metal amide particle having an exterior surface of the particle coated with an effective amount of TPP.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1A:
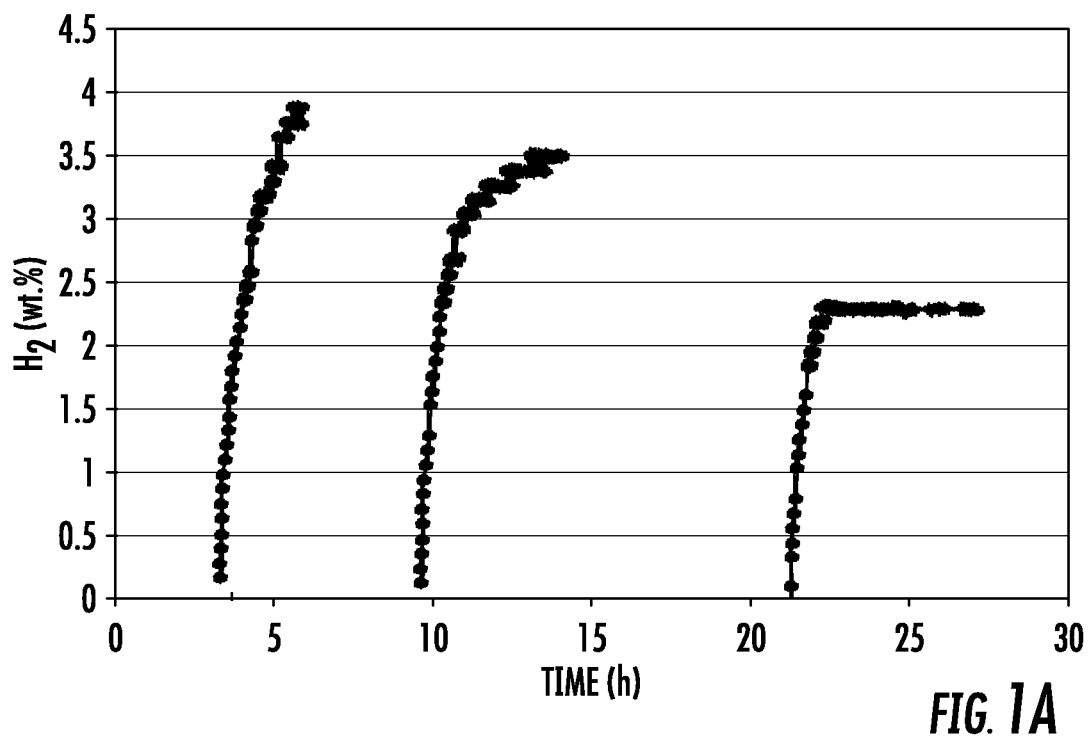
FIGS. 1a and 1b set forth control and modified desorption data for cycles 2, 3, and 4 of a metal amides including a control (FIG. 1a) and a TPP modified metal amide (FIG. 1b).

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with the present invention it has been found that metal amides, such as lithium magnesium amide can be treated so as to reduce its sensitivity to water or tendency to undergo spontaneous ignition upon exposure to air or moisture. It has been found that physically co-processing TPP with a hydrogen storage amide such as lithium magnesium amide results in a material having reduced activity towards water and air. One suitable co-processing step involves high energy ball milling though other conventional ball milling techniques include planetary mills, jar milling, and similar mechanical milling apparatuses may also be utilized.

Suitable amide hydrogen storage materials include lithium magnesium hydride. However, other hydrogen storage amides that have similar properties of degradation and ignition upon exposure to moisture or water are also suitable for use with the TPP modifier. The amide is preferably represented by the general formula $MI^d(NH_2)_d^{-1}$ and the hydride is preferably represented by the general formula $MII^fH_f$, where MI and MII respectively represent cationic species or a mixture of cationic species other than hydrogen, and d and f respectively represent the average valence states. Specific amides and hydrides are set forth in U.S. Pat. No. 6,967,012 and which is incorporated herein by reference. Additional useful hydrides may include hydrides disclosed in U.S. Pat. No. 8,071,064 and which is incorporated herein by reference.

It is believed that Group I and II metal amides are well suited for treatment with the TPP in view of the high surface reactivity of such materials when exposed to atmospheric conditions. The present invention is suitable for use with metal hydrides and complex hydrides where the TPP can act as a mitigant. TTP principally acts on the amide when it is used by itself or combined with a hydride material. While the illustrated embodiment was directed to a lithium hydride-magnesium amide system, the use of TPP could be applied to other amides and amide hydride materials.

As set forth in FIG. 1 data from a sample of $8LiH-3Mg(NH_2)_2$ was mixed with an amount of ball milled flakes of TPP to achieve a 5% mole addition of TPP. High-energy ball milling of the mixture was conducted for 5 minutes using a 10:1 ball to sample-weight ratio at 500 rpm.

Control samples which were not mixed with TPP react vigorously upon contact with water and undergo ignition. In contrast, the TPP containing sample, upon exposure to water, exhibited surface charring and provided a crust surface to the metal amide. It is believed that the curst reduces the contact of the underlying material with water and air and prevents ignition.

While a 5% mole ratio of TPP to metal amide was evaluated, similar effects were observed at lower ratios of approximately 3% mole.

Figure 1B:
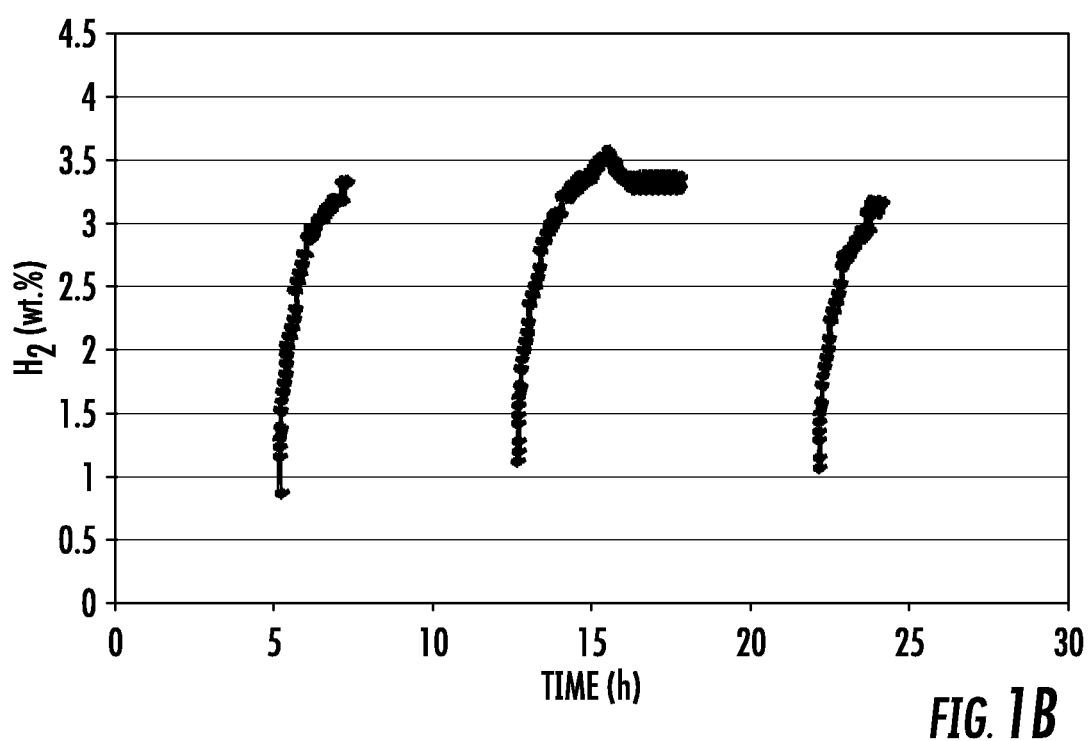

As best seen in reference to FIG. 1, the modified material as set forth in FIG. 1b shows significant improvement and cyclic durability during hydrogen sorption experiments in comparison to control samples.

It is noted that the TPP coating process and resulting coated material has increased hydrogen cycling durability which is believed attributed to the formation of a new stable compound by the reaction of TPP with the metal hydrides during ball milling. Without being unduly limited by theory, it is Applicant's belief that the new compound formed is less reactive on exposure to air and water.

Further, it is believed that the wax-like properties of TPP, when ball milled with a metal hydride, provides an exterior barrier that reduces exposure to material to air and water. Furthermore, it has been observed that when a heat release of a material exposed to water and/or air, the treated materials forms a charred exterior which results from malting or thermal reaction with TPP. The charring of the exterior is believed to further reduce the risk of ignition by endothermic reactions following exposure to moisture or air.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A hydrogen storage material comprising a mixture of a metal amide and a metal hydride of which is resistant to moisture and water comprising:
    the metal amide represented by the general formula $MI^d(NH_2)_d^{-1}$ and in which the metal hydride is represented by the general formula $MII^fH_f$, where MI and MII respectively represent cationic species or a mixture of cationic species other than hydrogen, and d and f respectively represent the average valence states with the mixture of the metal hydride and metal amide comprising $8LiH-3Mg(NH_2)_2$; and
    an exterior surface of the hydrogen storage material comprising the mixture of the metal amide and the metal hydride having a coating layer of TPP that stabilizes the hydrogen storage material with respect to the air and water exposure, such that the hydrogen storage material having the coating layer is resistant to water and air decomposition to increase safe handling of the mixture.

2. The hydrogen storage material according to claim 1 wherein the coating layer of TPP further defines a charred exterior layer from exposure to at least one of air or water.

3. The hydrogen storage material according to claim 1 where an effective amount of TPP is about 3 to about 5-mole % relative to the mixture of metal hydride and metal amide.

* * * * *